United States Patent [19]

Llanos

[11] Patent Number: 4,603,504
[45] Date of Patent: Aug. 5, 1986

[54] MOUSETRAP

[76] Inventor: Orestes L. Llanos, 3330 NW. 99th St., Miami, Fla. 33147

[21] Appl. No.: 715,915

[22] Filed: Mar. 25, 1985

[51] Int. Cl.⁴ ..................... A01M 23/04; A01M 23/06
[52] U.S. Cl. ............................................. 43/76; 43/65
[58] Field of Search ................... 43/76, 60, 61, 58, 65, 43/67, 69

[56] References Cited

U.S. PATENT DOCUMENTS

| | | | |
|---|---|---|---|
| 351,510 | 10/1886 | Holland | 43/76 |
| 1,053,053 | 2/1913 | Miller | 43/76 |
| 1,155,842 | 10/1915 | Shadley | 43/76 |
| 1,180,654 | 4/1916 | Kirk | 43/76 |
| 1,547,375 | 7/1925 | Fisher | 43/76 |
| 2,632,279 | 3/1953 | Gumfory | 43/76 |
| 3,828,460 | 8/1974 | Herman . | |

*Primary Examiner*—M. Jordan
*Attorney, Agent, or Firm*—Jesus Sanchelima

[57] ABSTRACT

A mousetrap having a housing with an entrance compartment, a one-way tunnel connected to the upper part of the entrance compartment and a storage compartment. The entrance compartment has a resettable balance or ramp that tips over when the animal walks over it towards a bait that is positioned at a suitable location beyond the tipping point. Once tipped, the balance portion leading to the entrance is elevated beyond the entrance opening leaving only one available path for the animal, the one-way tunnel. A latch member holds the balance in that position until it is released by the animal after it goes through a second one-way door inside the tunnel. From the tunnel, the animal can only go to the storage compartment.

3 Claims, 5 Drawing Figures

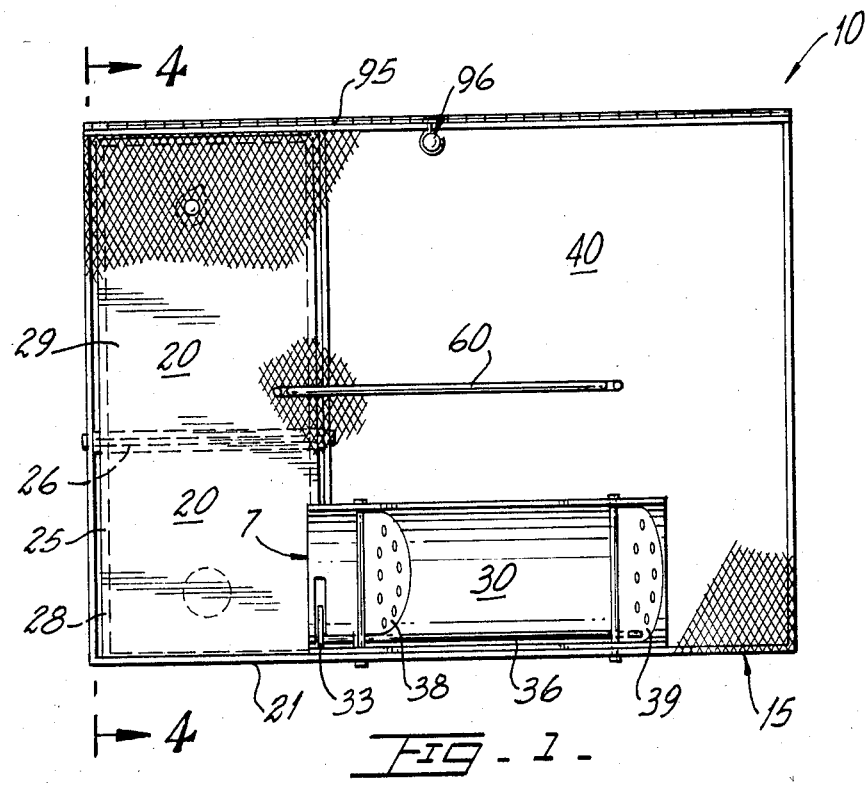
FIG-1-
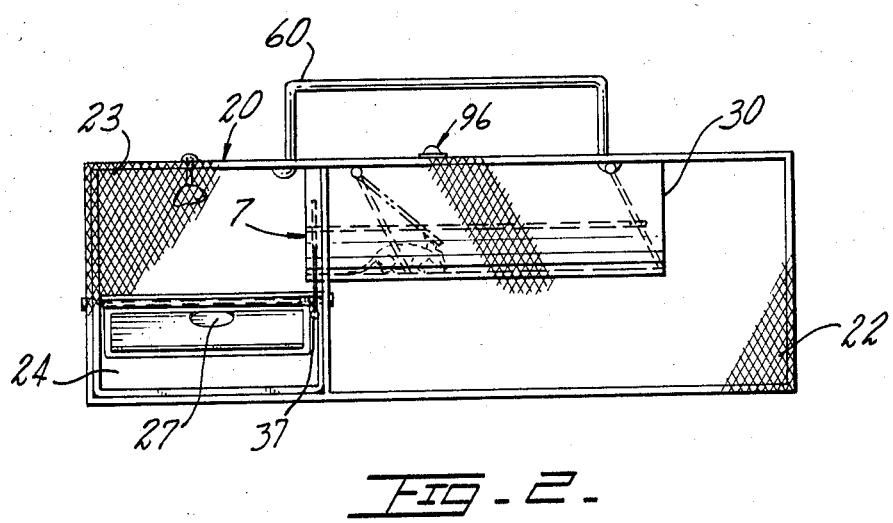
FIG-2-
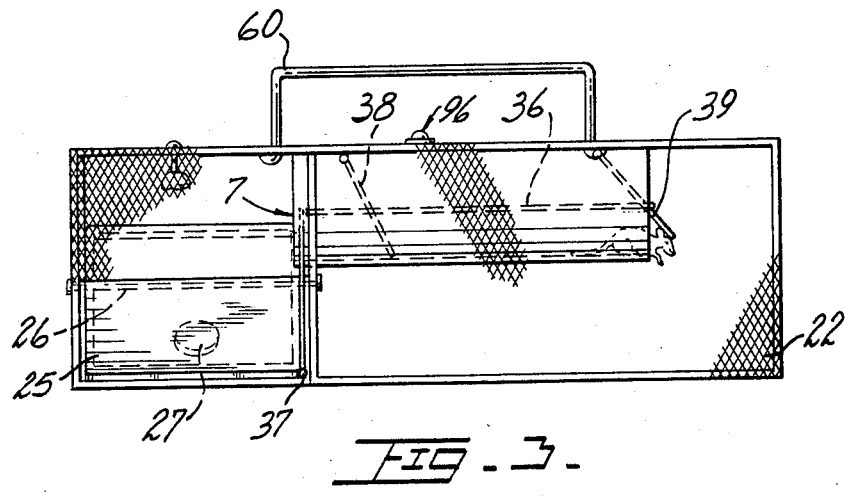
FIG-3-

MOUSETRAP

BACKGROUND OF THE INVENTION

1. Field of the Invention

The present invention relates to mousetraps, and more particularly, to mousetraps capable of being reset by itself to catch more than one animal without requiring attention from the user.

2. Description of the Prior Art

A better mousetrap. This phrase has been coined by patent attorneys to denote improvement over the prior art as a classic example. The need for such a device is quite obvious since the destruction and disease these animals cause is well documented.

There have been many types and designs of traps for rodents. The closest prior art corresponds to the one disclosed in U.S. Pat. No. 3,828,460 issued to Fritz Herman on Aug. 13, 1974. In this patent, a trap walk is used with a swing-type lock. Herman's trap is different from the present invention since here a prop is not used. A deficiency in Herman's device is that it can only take one animal at the time and the present invention provides a one-way tunnel that separates the trap compartment from the storage section and uses the movement of the animal to reset the trap. Therefore, the present invention can be left unattended.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide a trap designed primarily for rodent animals that can be continuously reset by the animal itself as it follows a predetermined path that leads it to a separate storage compartment.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a top view of the mousetrap.

FIG. 2 shows a front view of the present invention indicating how the animal advances through the only possible path available.

FIG. 3 illustrates the same front view as the animal passes the second one-way door which resets the entrance ramp or balance member.

DETAILED DESCRIPTION OF THE PREFERRED EMBODIMENT

Figure 4:
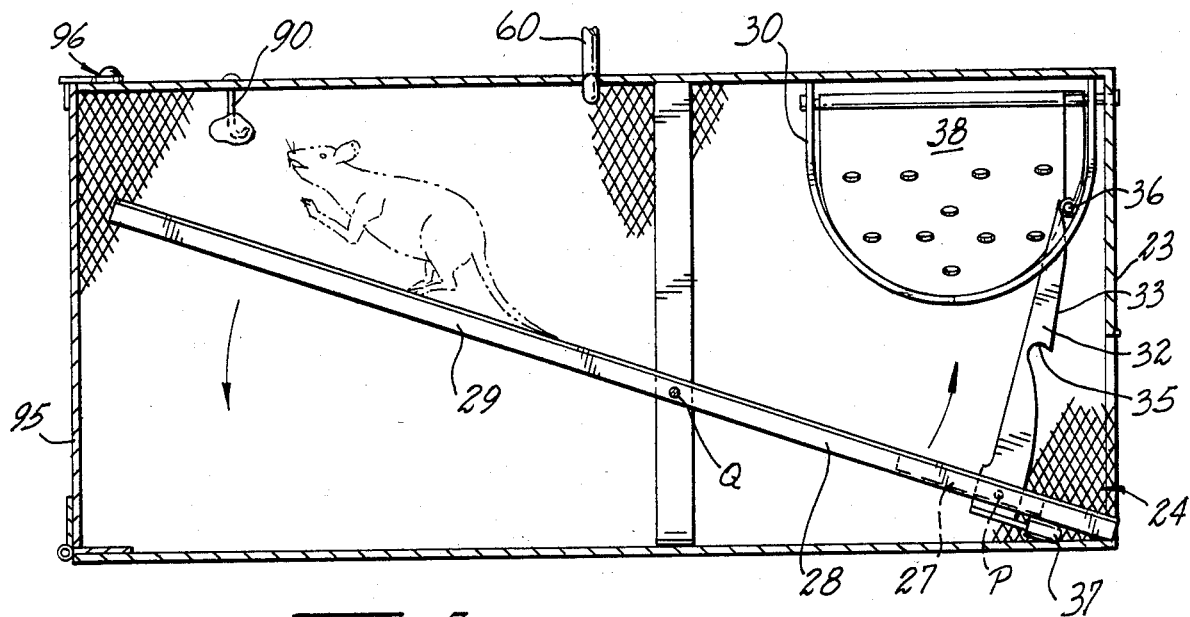
FIG. 4 is a cross-sectional view of FIG. 1, along line 4—4, showing the gravitational effect of the animal's weight on the ramp or balance member.

Referring now to the figures, where the present invention is generally referred to with numeral 10, it can be observed that it includes, basically, a housing 15 divided into three compartments, namely, entrance 20, one-way tunnel 30 and storage 40 compartments. Housing 15 is covered with a mesh wire 22 suitable characteristics to prevent the trapped animals from escaping.

Entrance 21 is, in the preferred embodiment, a rectangular or square frame on one of the sides of housing 15. The upper section 23 is covered with mesh 22 and lower section 24 is open thereby allowing the animal to come in when ramp or balance member 25 is inclined, as shown in FIG. 3. In FIG. 2, the balance is substantially in horizontal position, and the animal cannot go back and escape through the entrance. Balance member 25 may be a solid board or made out of the same meshed wire 22 provided that it is pivoted around axle 26. The pivoting point location Q is off the center of balance member 25, as it can be seen from FIG. 1. To insure that front or shorter portion 28 of balance member 25 is normally lower than rear or longer portion 29, weight member 27 is mounted to the underside of front portion 28. Front portion 28 is smaller than rear portion 29 so that the animal may exert, through its weight, more torque. This makes the balance mechanism more sensitive to the distance travelled by the animal.

Figure 5:
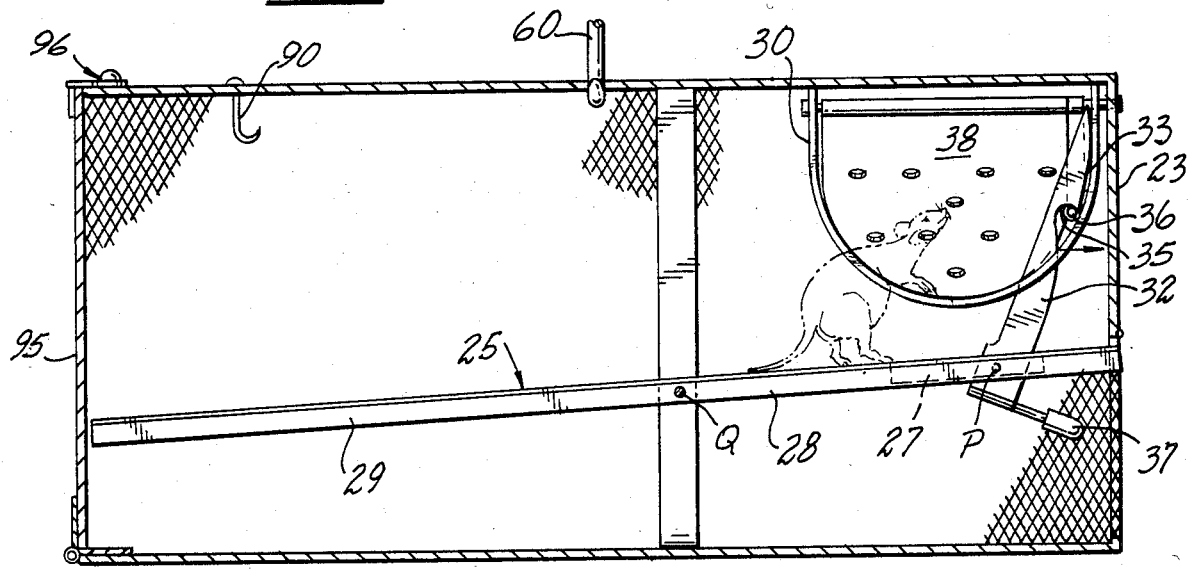
FIG. 5 depicts the ramp in locked position and the animal exploring the only possible path out through the first one-way door.

Locking latch 32 is pivotally and upwardly mounted on inner edge 33 of front portion 28 of balance member 25 and it is provided with a cam edge 33 and locking cavity 35 that engages with locking pin 36, as shown in FIGS. 4 and 5. Latch 32 pivots around point P and it is provided with counterweight 37 that urges latch 32 forward so that when front portion 28 of balance member 25 comes up, latch 32 slidably touches pin 36 along edge 33, and finally locks in with locking cavity 35.

Entrance compartment 20 is also provided with exit 7 which leads to one-way tunnel 30.

One-way tunnel 30 is substantially a tubular compartment with two one-way doors 38 and 39 that are hingedly mounted to the inner part of the top of tunnel 30 is shown in the drawings. Locking pin or linkage arm 36 is mounted on door 39 and extends towards entrance compartment 20 touching latch 32, as explained above.

Storage compartment 40, as shown in FIG. 1, occupies the balance of the space of housing 15. Handle 60 is mounted to a suitable section of housing 15 or mesh wire 22. Bait hook 90 is mounted in a suitable place inside housing 15. A door 95 in storage compartment 40 allows the user to take out the animals after killing them (drowning them) or release them if he or she so desires.

Basically, the operation of the trap is as follows: the animal sees or smells the bait on hook 90 and looks for a way to get to it. After entering through lower section 24 and walking up balance member 25 past axle 26, its weight produces a torque that, added to the torque of portion 29 of member 25 counteracts the torque produced by portion 28 and weights 27. Since portion 29 is longer than portion 28, the animal's weight will be able to exert enough leverage to overcome weight 27 rapidly as it approaches bait hook 90. This causes portion 29 to come down as substantially place balance member 25 in a horizontal position. The exact positioning is not important provided that portion 28 is sufficiently raised to close the space inside entrance compartment 20, above member 25, with upper section 23. Locking latch 32, as it can be seen from FIG. 4, is in contact with pin 36 which is mounted to second one-way door 39. As portion 28 of member 25 comes up, cam edge 33 of latch member 32 slidably travels upwardly until cavity 35 traps pin or arm 36 thereby locking member 25 in place. A counterweight 37 urges edge 33 against arm 36 to insure its engagement within cavity 35. Once balance member 25 is in the locked or closed position, the animal can only proceed through first one-way door 38 into one-way tunnel 30, and then, through second one-way door 39 into storage compartment 40. As the animal passes through second door 39, its rotational movement causes arm 36 to move to the right, releasing latch member 32 cause portion 28 to go down thereby resetting the trap. The present invention will continue to trap animals unattended. The bait on hook 90 usually lasts a long time because when the animal feels trap it does not stop to eat, but rather, it explores all possible paths out.

A door 95 is provided with latch 96 so that the animals may be retrieved, either dead or alive.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A trap for rodents, comprising:
   A. a housing covered by mesh wire of suitable characteristics to keep the animal in while at the same time allows it to see through said housing walls;
   B. an entrance compartment defined within said housing having an entrance and an exit;
   C. an off-center balance member positioned within said entrance compartment and having adequate dimensions to fit exactly within said entrance compartment, and said member having sufficient weight means mounted to its shorter portion so that it overcomes the opposite longer portion thereby keeping said entrance open in the normal position and closing it when the animal walks in past the center of said balance member;
   D. a one-way tunnel compartment connected to said exit so that said animal can go through it when said balance member is in the closed position, and said tunnel including a first door adjacent to said exit and second one-way door at a point sufficiently beyond said first door to allow the animal within both doors;
   E. latch means for holding said balance member in closed position and releasable by said animal as it moves said second one-way door and said latch means includes an upwardly extending latch member pivotally mounted on the side edge of said balance member that is closer to said tunnel and said second one-way door further includes an elongated linkage arm that extends towards said latch member and engageable with it to maintain said balance member in closed position and capable of releasing it when said second one-way door is moved by the animal thereby resetting said balance member; and
   F. storage compartment means connected to said second one-way door so that animals may be accumulated therein as they go through said second door.

2. The device set forth in claim 1 wherein said latch member includes counterweight means that urge it toward said linkage arm, and said latch member further including a cavity positioned at a predetermined point so that said it engages with said linkage arm.

3. The device set forth in claim 2 wherein said storage compartment means includes a door to release said animals easily.

* * * * *